(12) United States Patent
Liu et al.

(10) Patent No.: US 9,548,810 B2
(45) Date of Patent: Jan. 17, 2017

(54) OPTICAL PATH PROCESSING METHOD AND APPARATUS

(71) Applicant: Huawei Technologies Co., Ltd., Shenzhen (CN)

(72) Inventors: Xishe Liu, Shenzhen (CN); Shijun Wang, Wuhan (CN); Heyuan Liu, Lagos (NG); Zhiyong Xiao, Wuhan (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 14/839,477

(22) Filed: Aug. 28, 2015

(65) Prior Publication Data

US 2015/0372752 A1    Dec. 24, 2015

Related U.S. Application Data

(63) Continuation of application No. PCT/CN2014/080070, filed on Jun. 17, 2014.

(30) Foreign Application Priority Data

Jun. 21, 2013   (CN) .......................... 2013 1 0250628

(51) Int. Cl.
*H04B 10/00* (2013.01)
*H04B 10/071* (2013.01)
(Continued)

(52) U.S. Cl.
CPC ........ *H04B 10/071* (2013.01); *G01M 11/3136* (2013.01); *H04J 14/0227* (2013.01);
(Continued)

(58) Field of Classification Search
CPC .............. H04B 10/071; H04Q 11/0005; H04Q 2011/016; H04Q 2011/024; H04Q 2011/026; H04Q 2011/003
See application file for complete search history.

(56) References Cited

U.S. PATENT DOCUMENTS

2004/0062478 A1   4/2004  Ludington et al.
2006/0093258 A1*  5/2006  Terahara ............ H04Q 11/0005
                                                            385/18
(Continued)

FOREIGN PATENT DOCUMENTS

CN       1769944 A    5/2006
CN       1831574 A    9/2006
(Continued)

*Primary Examiner* — Daniel Dobson
(74) *Attorney, Agent, or Firm* — Slater Matsil, LLP

(57) ABSTRACT

The present invention provides an optical path processing method and apparatus. The apparatus includes an FA, an LA, an aspheric lens, a filter, and a reflector, where the FA includes a test optical channel, where the test optical channel is configured to receive test light, and enable the test light to be incident through the LA and the aspheric lens to a surface of the filter; the filter is located between the aspheric lens and the reflector, and is configured to perform transmission on the test light; and the reflector is at a distance of less than or equal to a first preset value away from a focus of light transmitted through the aspheric lens, and is configured to reflect, at a preset angle, the test light transmitted through the filter to a specular surface of the reflector.

12 Claims, 4 Drawing Sheets

(51) Int. Cl.
    *G01M 11/00*     (2006.01)
    *H04J 14/02*     (2006.01)
    *H04Q 11/00*     (2006.01)
    *H04J 14/00*     (2006.01)
    *G02B 6/293*     (2006.01)
    *G02B 3/04*     (2006.01)

(52) U.S. Cl.
    CPC ..... *H04Q 11/0005* (2013.01); *H04Q 11/0067* (2013.01); *G02B 3/04* (2013.01); *G02B 6/29304* (2013.01); *H04Q 2011/0016* (2013.01); *H04Q 2011/0083* (2013.01)

(56) References Cited

U.S. PATENT DOCUMENTS

| | | |
|---|---|---|
| 2006/0198583 A1* | 9/2006 | Oikawa .............. H04Q 11/0005 385/53 |
| 2007/0122152 A1 | 5/2007 | Matthews |
| 2009/0103861 A1 | 4/2009 | Presley et al. |
| 2009/0110349 A1 | 4/2009 | Presley et al. |
| 2012/0020620 A1 | 1/2012 | Wu et al. |
| 2013/0343758 A1 | 12/2013 | Wang et al. |

FOREIGN PATENT DOCUMENTS

| | | |
|---|---|---|
| CN | 202050420 U | 11/2011 |
| CN | 102369679 A | 3/2012 |
| CN | 102645705 A | 8/2012 |
| EP | 1967877 A2 | 9/2008 |
| JP | 2007164109 A | 6/2007 |
| WO | 02071119 A1 | 9/2002 |
| WO | 2012113317 A1 | 8/2012 |

* cited by examiner

OPTICAL PATH PROCESSING METHOD AND APPARATUS

This application is a continuation of International Application No. PCT/CN2014/080070, filed on Jun. 17, 2014, which claims priority to Chinese Patent Application No. 201310250628.2, filed on Jun. 21, 2013, both of which are hereby incorporated by reference in their entireties.

TECHNICAL FIELD

The present invention relates to optical fiber network technologies, and in particular, to an optical path processing method and apparatus.

BACKGROUND

As an access network involves a large quantity of end users and complexly distributed optical link branches, and an all-fiber passive network is used for an entire network, how to implement appropriate monitoring and maintenance on optical links becomes a technical problem that needs to be urgently resolved by an operator. Currently, a monitoring system of an operator mainly uses an optical time domain reflectometer (OTDR) to test a link. A relatively mainstream manner of the testing is: using a 1×N optical switch and a dense wavelength division multiplexer (DWDM) to access N access ends. Specifically, FIG. 1 is a schematic diagram of a principle of a monitoring system in the prior art. As shown in FIG. 1, the monitoring system may be placed in a central office optical distribution frame (ODF), and monitors multiple passive optical networks (PONs), where the PONs include an optical line terminal (OLT), and the monitoring system includes an OTDR 11, a 1×N optical switch 12, and N WDMs 13. An operating principle of the monitoring system is as follows: The OTDR 11 is connected to an input end of the 1×N optical switch 12; after the OTDR 11 inputs OTDR test light to the 1×N optical switch 12 by using the input end of the 1×N optical switch 12, the OTDR test light may be switched to a particular output channel by using a control system; then, by using a WDM 13 corresponding to the particular output channel, the OTDR test light is coupled to a corresponding PON, and is transmitted downstream to an ONU to generate backscattering, where backscattered light coupled to the PON is transmitted upstream to the WDM 13 and is returned to the OTDR 11.

However, each output end of a 1×N optical switch needs one WDM, and therefore, when a large-split ratio optical switch is used, costs of the monitoring system and difficulty in managing a fiber patch cord between the optical switch and a WDM may be increased. In addition, space pressure on an equipment room whose space resource is already tight is also increased.

SUMMARY

The present invention provides an optical path processing method and apparatus, so as to avoid management of a fiber optic patch cord between an optical switch and a WDM in the prior art, and further reduce assembling costs and improve space utilization.

A first aspect of the present invention provides an optical path processing apparatus, including: a Fiber Array (FA), a Lens Array (LA), an aspheric lens, a filter, and a reflector, where the FA includes a test optical channel, where the test optical channel is configured to receive test light, and enable the test light to be incident through the LA and the aspheric lens to a surface of the filter; the filter is located between the aspheric lens and the reflector, and is configured to perform transmission on the test light; and the reflector is at a distance of less than or equal to a first preset value away from a focus of light transmitted through the aspheric lens, and is configured to reflect, at a preset angle, the test light transmitted through the filter to a specular surface of the reflector, so that reflected light corresponding to the test light passes through the filter, the aspheric lens and the LA, and is output through a particular channel.

With reference to the first aspect, in a first possible implementation manner of the first aspect, the FA further includes a service optical channel, where the service optical channel includes a first segment service optical channel and a second segment service optical channel, where the first segment service optical channel is configured to receive service light, and enable the service light to be incident through the LA and the aspheric lens to the surface of the filter; and the filter is further configured to reflect the service light, so that reflected light corresponding to the service light passes through the aspheric lens and the LA, and is output through the second segment service optical channel; where the first segment service optical channel is located in a first part of the FA, and the second segment service optical channel is located in a second part of the FA, where the first part and the second part are two horizontally and vertically symmetric parts into which the FA is divided with the test optical channel as a center.

With reference to the first possible implementation manner of the first aspect, in a second possible implementation manner of the first aspect, the particular channel is the second segment service optical channel.

With reference to the first possible implementation manner of the first aspect, in a third possible implementation manner of the first aspect, a distance between the filter and a focus of the service light of the aspheric lens is less than or equal to a second preset value.

With reference to the first aspect or any one of the first to the third possible implementation manners of the first aspect, in a fourth possible implementation manner of the first aspect, the test optical channel is coaxial with the LA and the aspheric lens.

A second aspect of the present invention provides an optical path processing method, including receiving test light by using a test optical channel; enabling the test light to be incident through a lens array LA and an aspheric lens to a surface of a filter, and performing transmission on the test light by using the filter; adjusting a reflector, so that the reflector reflects, at a preset angle, the test light transmitted through the filter to a specular surface of the reflector; and enabling reflected light corresponding to the test light to pass through the filter, the aspheric lens and the LA, and outputting, through a particular channel, the reflected light corresponding to the test light; where a distance between the reflector and a focus of light transmitted through the aspheric lens is less than or equal to a first preset value.

With reference to the second aspect, in a first possible implementation manner of the second aspect, the optical path processing method further includes dividing an FA so as to acquire a first part, a second part, and the test optical channel, where the first part and the second part are two horizontally and vertically symmetric parts, with the test optical channel as a center, in the FA; where channels that are in a one-to-one correspondence with the first part and the second part form a service optical channel.

With reference to the first possible implementation manner of the second aspect, in a second possible implementation manner of the second aspect, the optical path processing method further includes receiving service light by using a first segment service optical channel; enabling the service light to be incident through the LA and the aspheric lens to the surface of the filter, and reflecting the service light by using the filter; and outputting, through a second segment service optical channel, reflected light that is corresponding to the service light and that passes through the aspheric lens and the LA; where the service optical channel includes the first segment service optical channel and the second segment service optical channel, where the first segment service optical channel is located in the first part and the second segment service optical channel is located in the second part.

With reference to the second possible implementation manner of the second aspect, in a third possible implementation manner of the second aspect, the enabling reflected light corresponding to the test light to pass through the filter, the aspheric lens and the LA, and outputting, through a particular channel, the reflected light corresponding to the test light includes enabling the reflected light corresponding to the test light to pass through the filter, the aspheric lens and the LA, and outputting, through the second segment service optical channel, the reflected light corresponding to the test light.

With reference to the second possible implementation manner of the second aspect, in a fourth possible implementation manner of the second aspect, a distance between the filter and a focus of the service light of the aspheric lens is less than or equal to a second preset value.

With reference to the second aspect or any one of the first to the fourth possible implementation manners of the second aspect, in a fifth possible implementation manner of the second aspect, the adjusting a reflector, so that the reflector reflects, at a preset angle, the test light transmitted through the filter to a specular surface of the reflector includes controlling, in a MEMS manner, a mechanical manner or a waveguide manner, a position or an angle that is of the specular surface of the reflector and in three-dimensional space, so that the reflector reflects, at the preset angle, the test light transmitted through the filter to the specular surface of the reflector.

With reference to the second aspect or any one of the first to the fourth possible implementation manners of the second aspect, in a sixth possible implementation manner of the second aspect, the test optical channel is coaxial with the LA and the aspheric lens.

Technical effects of the present invention are as follows. A test optical channel receives test light, and enables the test light to be incident through an LA and an aspheric lens to a surface of filter; the filter then transmits the test light to a reflector located behind the filter; and the reflector then reflects, at a preset angle, the test light transmitted to a specular surface of the reflector, so that reflected light corresponding to the test light passes through the filter, the aspheric lens and the LA, and is output through a particular channel, where a distance between the reflector and a focus of light transmitted through the aspheric lens is less than or equal to a first preset value. Compared with that an optical switch needs a large quantity of separate WDMs in the prior art, that is, each output end of the optical switch needs one WDM, that a WDM is built in an optical switch is implemented in the present invention, thereby not only avoiding management of a fiber optic patch cord between an optical switch and a WDM in the prior art, but also reducing assembling costs and improving space utilization.

DESCRIPTION OF EMBODIMENTS

Figure 1:
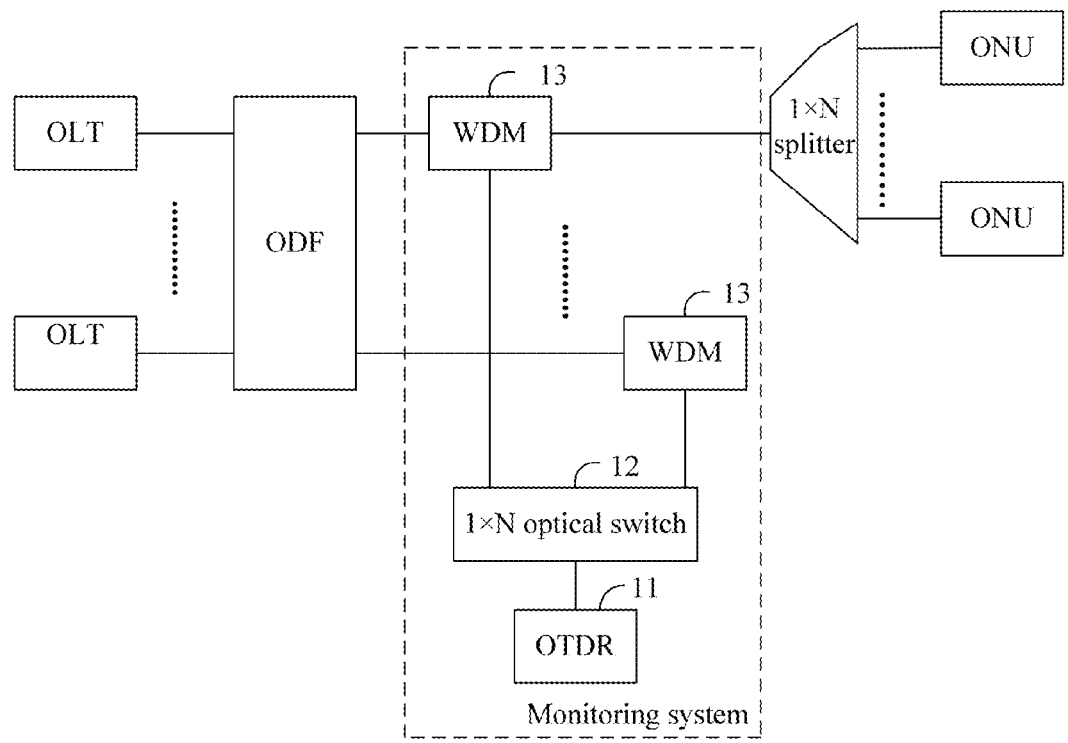
FIG. 1 is a schematic diagram of a principle of a monitoring system in the prior art.
Figure 2:
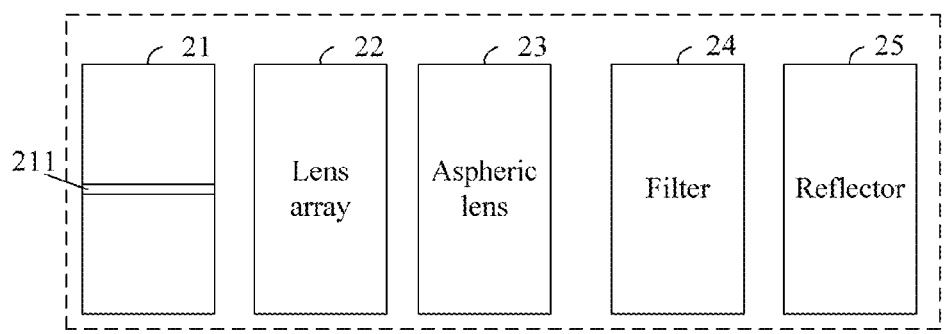
FIG. 2 is a schematic structural diagram of an embodiment of an optical path processing apparatus according to the present invention.

FIG. 2 is a schematic structural diagram of an embodiment of an optical path processing apparatus according to the present invention. As shown in FIG. 2, the optical path processing apparatus in this embodiment may be an optical switch, where the optical switch includes a fiber array (FA) 21, a lens array (LA) 22, an aspheric lens 23, a filter 24, and a reflector 25. The FA 21 includes a test optical channel 211, where the test optical channel 211 is configured to receive test light, and enable the test light to be incident through the LA 22 and the aspheric lens 23 to a surface of the filter 24. The filter 24 is located between the aspheric lens 23 and the reflector 25, and is configured to perform transmission on the test light. The reflector 25 is at a distance of less than or equal to a first preset value away from a focus of light transmitted through the aspheric lens 23, and is configured to reflect, at a preset angle, the test light transmitted through the filter 24 to a specular surface of the reflector 25, so that reflected light corresponding to the test light passes through the filter 24, the aspheric lens 23 and the LA 22, and is output through a particular channel.

In this embodiment, for example, the test light may specifically be OTDR test light, where the OTDR test light is within a transmission band whose range is 1610 nm to 1675 nm. The first preset value may specifically be 1 mm.

Figure 3:
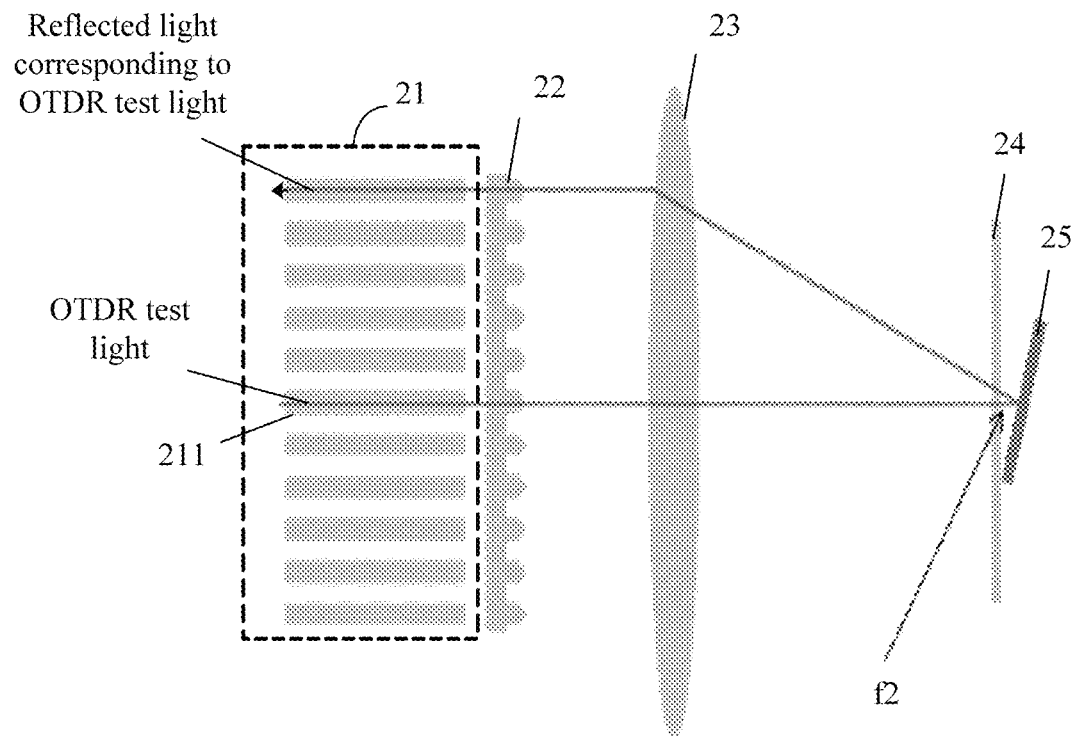
FIG. 3 is a schematic diagram of a principle of a test optical channel.

In this embodiment, for example, FIG. 3 is a schematic diagram of a principle of a test optical channel. As shown in FIG. 3, the test light is input through the test optical channel 211, and the test light is incident through the LA 22 and the aspheric lens 23 to the surface of the filter 24 and is transmitted through the filter 24. The reflector 25 is placed less than or equal to 1 mm behind a focus f2 corresponding to a wavelength of the test light. After the test light is incident to the specular surface of the reflector 25, the reflector 25 reflects the test light at the preset angle. The reflected light corresponding to the test light passes through the filter 24, the aspheric lens 23 and the LA 22, and is output through the particular channel of the FA. It should be noted that, for a same lens (a lens may be a spherical lens or an aspheric lens), after different bands are incident, a focus shift occurs. A focus of light with a short wavelength is located before a focus of light with a long wavelength.

In this embodiment, test light is received by using a test optical channel, and is incident through an LA and an aspheric lens to a surface of the filter; the filter then transmits the test light to a reflector located behind the filter; and the reflector then reflects, at a preset angle, the test light transmitted to a specular surface of the reflector, so that reflected light corresponding to the test light passes through the filter, the aspheric lens and the LA, and is output through a particular channel, where a distance between the reflector and a focus of light transmitted through the aspheric lens is less than or equal to a first preset value. Compared with that an optical switch needs a large quantity of separate WDMs in the prior art, that is, each output end of the optical switch needs one WDM, that a WDM is built in an optical switch is implemented in the present invention, thereby not only avoiding management of a fiber optic patch cord between an optical switch and a WDM in the prior art, but also reducing assembling costs and improving space utilization.

Figure 4:
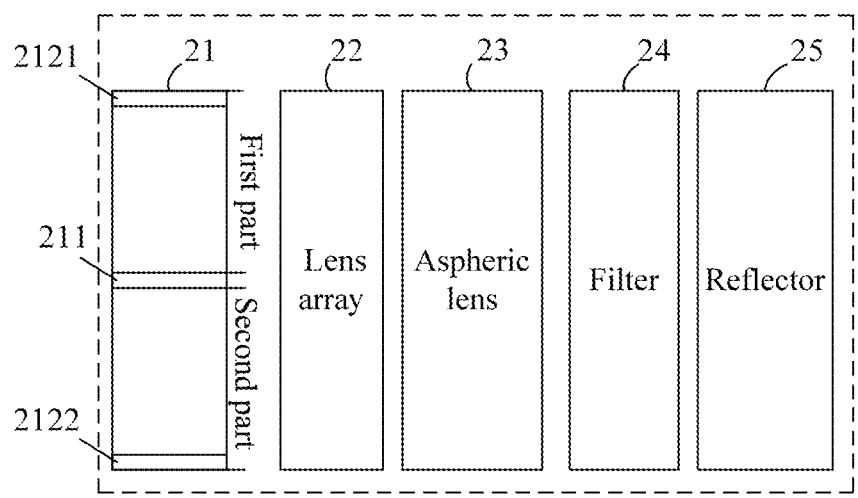
FIG. 4 is a schematic structural diagram of another embodiment of an optical path processing apparatus according to the present invention.

FIG. 4 is a schematic structural diagram of another embodiment of an optical path processing apparatus according to the present invention. Based on the foregoing embodiment shown in FIG. 2, as shown in FIG. 4, the FA 21 further includes a service optical channel (not drawn in the diagram), where the service optical channel includes a first segment service optical channel 2121 and a second segment service optical channel 2122. Specifically, the first segment service optical channel 2121 is configured to receive service light, and enable the service light to be incident through the LA 22 and the aspheric lens 23 to the surface of the filter 24. The filter 24 is further configured to reflect the service light, so that reflected light corresponding to the service light passes through the aspheric lens 23 and the LA 22, and is output through the second segment service optical channel 2122. The first segment service optical channel 2121 is located in a first part of the FA 21, and the second segment service optical channel 2122 is located in a second part of the FA 21, where the first part and the second part are two horizontally and vertically symmetric parts into which the FA 21 is divided with the test optical channel 211 as a center.

In this embodiment, the FA 21 may specifically be an N×N array, where N is an integer. When N is an odd number, the FA 21 may be divided into two horizontally and vertically symmetric parts with a central channel (that is, the test optical channel 211) as a center, separately being the first part and the second part.

When N is an even number, the FA 21 may be divided into two horizontally and vertically symmetric parts with central channels as centers, separately being the first part and the second part. There are two central channels, where one of the central channels may be used as the test optical channel, and the other may be used as a backup test optical channel.

Figure 5:
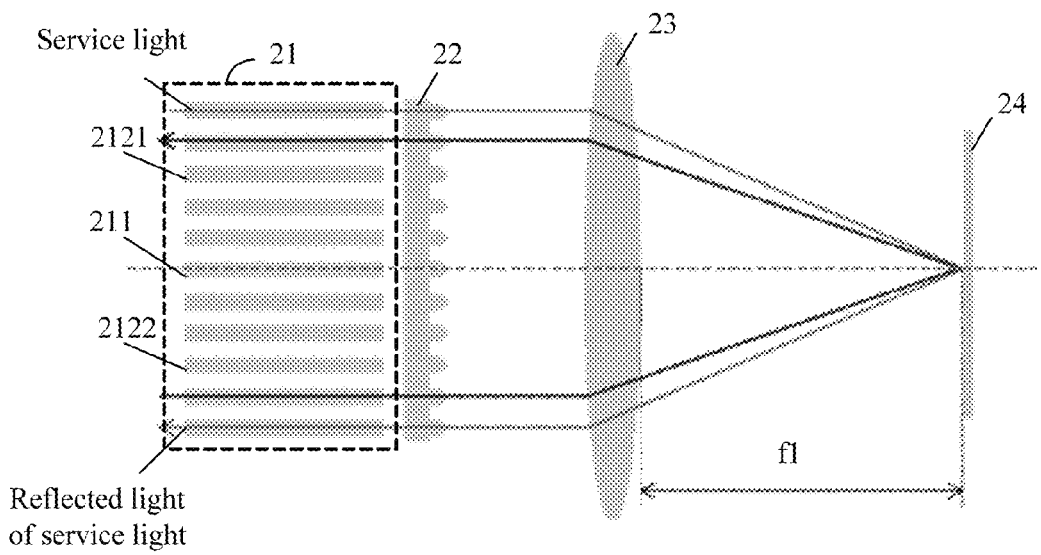
FIG. 5 is a schematic diagram of a principle of a service optical channel.

In this embodiment, for example, FIG. 5 is a schematic diagram of a principle of a service optical channel. As shown in FIG. 5, the service light is input through the first segment service optical channel 2121 in the first part or through the second segment service optical channel 2122 in the second part, and converges at a focus f1 after passing through the LA 22 and the aspheric lens 23. The filter 24 is placed at f1, and the service light is within a reflection band of the filter 24, where a range of the reflection band is 1260 nm to 1587 nm. Therefore, the reflected light corresponding to the service light is output through the second segment service optical channel 2122 in the second part or through the first segment service optical channel 2121 in the first part.

In addition, optionally, when a quantity of ports of the service optical channel is 128, the FA may specifically be a 17×17 array.

Further, when the service light is input through the first segment service optical channel 2121 in the first part and converges at the focus f1 after passing through the LA 22 and the aspheric lens 23, and the reflected light corresponding to the service light is output through the second segment service optical channel 2122 in the second part by using the filter 24, the particular channel is the second segment service optical channel, that is, the test light and the reflected light that is corresponding to the service light are output through a same channel.

When the service light is input through the second segment service optical channel 2122 in the second part and converges at the focus f1 after passing through the LA 22 and the aspheric lens 23, and the reflected light corresponding to the service light is output through the first segment service optical channel 2121 in the first part by using the filter 24, the particular channel is the first segment service optical channel, that is, the test light and the reflected light that is corresponding to the service light are output through a same channel.

Further, a distance between the filter 24 and a focus of the service light of the aspheric lens 23 is less than or equal to a second preset value.

In this embodiment, for example, the second preset value may be 0.5 millimeter.

Further, the test optical channel 211 is coaxial with the LA 22 and the aspheric lens 23.

Figure 6:
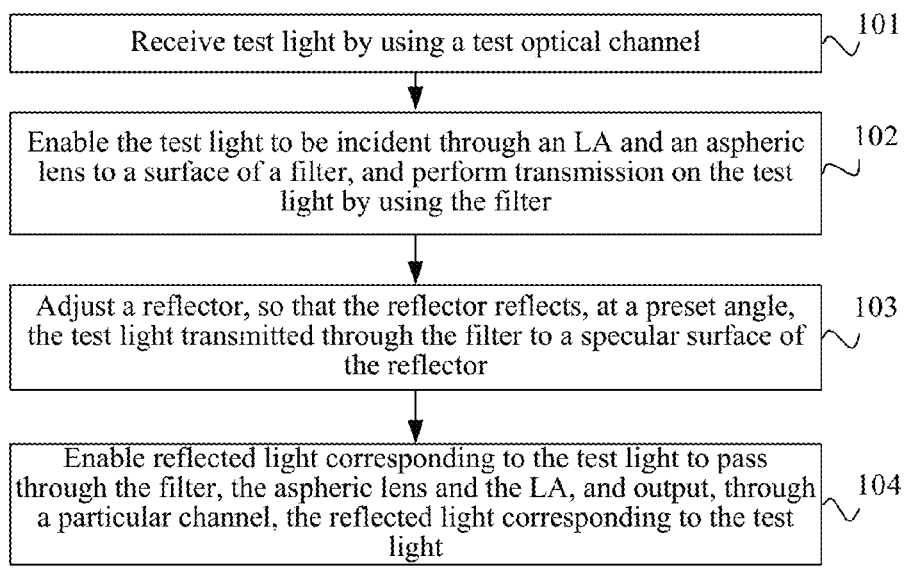
FIG. 6 is a flowchart of an embodiment of an optical path processing method according to the present invention.

FIG. 6 is a flowchart of an embodiment of an optical path processing method according to the present invention. The method in this embodiment is executed by an optical path processing apparatus. The optical path processing apparatus may specifically be the foregoing optical path processing apparatus shown in FIG. 2; then, the method includes:

Step 101: Receive test light by using a test optical channel.

Step 102: Enable the test light to be incident through an LA and an aspheric lens to a surface of a filter, and perform transmission on the test light by using the filter.

Step 103: Adjust a reflector, so that the reflector reflects, at a preset angle, the test light transmitted through the filter to a specular surface of the reflector.

Step 104: Enable reflected light corresponding to the test light to pass through the filter, the aspheric lens and the LA, and output, through a particular channel, the reflected light corresponding to the test light.

A distance between the reflector and a focus of light transmitted through the aspheric lens is less than or equal to a first preset value.

In this embodiment, test light is received by using a test optical channel, and is incident through an LA and an aspheric lens to a surface of the filter; the filter then transmits the test light to a reflector located behind the filter; and the reflector then reflects, at a preset angle, the test light transmitted to a specular surface of the reflector, so that reflected light corresponding to the test light passes through the filter, the aspheric lens and the LA, and is output through a particular channel, where a distance between the reflector and a focus of light transmitted through the aspheric lens is less than or equal to a first preset value. Compared with that an optical switch needs a large quantity of separate WDMs in the prior art, that is, each output end of the optical switch needs one WDM, that a WDM is built in an optical switch is implemented in the present invention, thereby not only avoiding management of a fiber optic patch cord between an optical switch and a WDM in the prior art, but also reducing assembling costs and improving space utilization.

Figure 7:
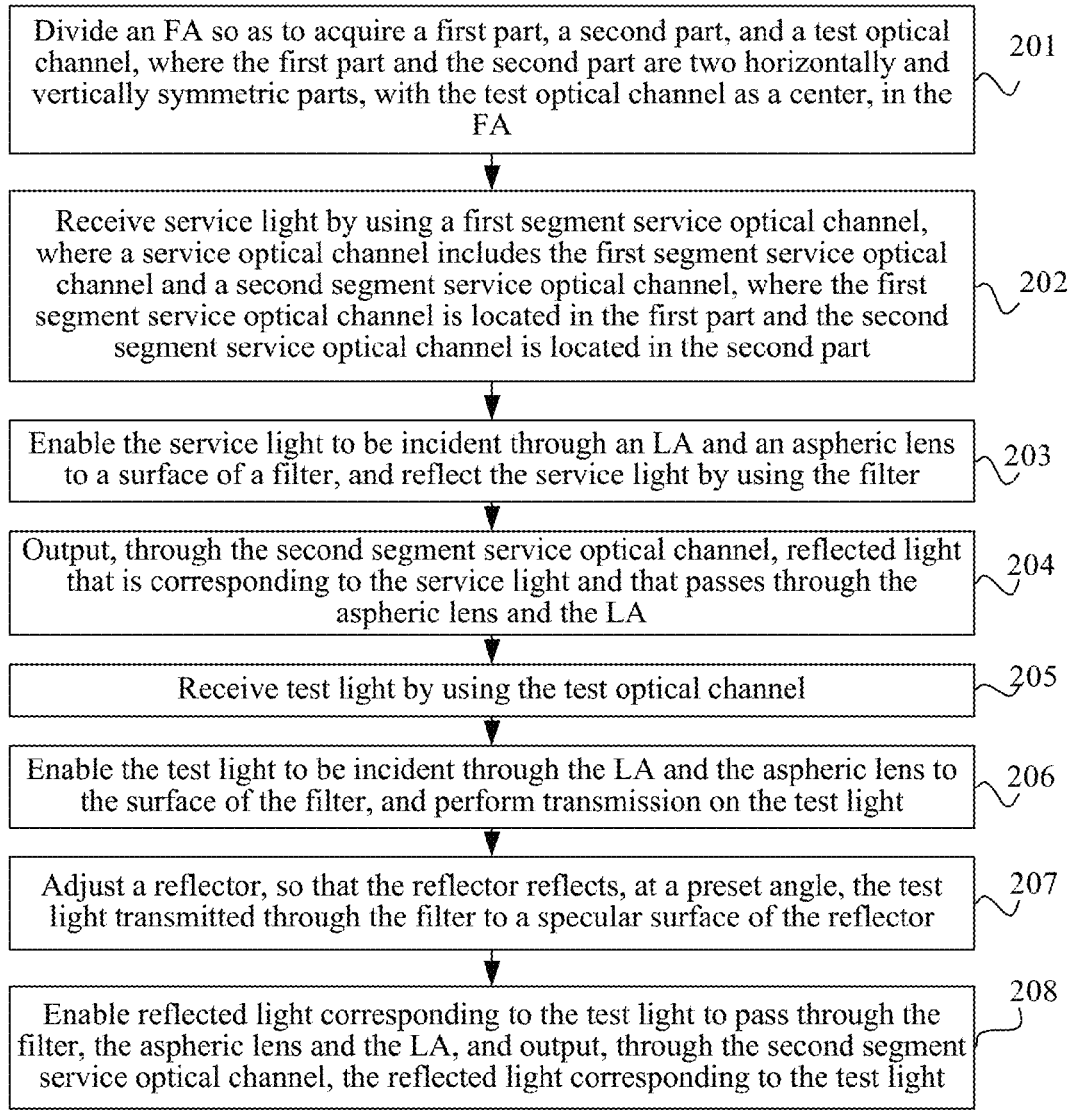
FIG. 7 is a flowchart of another embodiment of an optical path processing method according to the present invention.

FIG. 7 is a flowchart of another embodiment of an optical path processing method according to the present invention. As shown in FIG. 7, the method in this embodiment may be executed by an optical path processing apparatus. The optical path processing apparatus may specifically be the foregoing optical path processing apparatus shown in FIG. 4; then, the method includes:

Step 201: Divide an FA so as to acquire a first part, a second part, and a test optical channel, where the first part and the second part are two horizontally and vertically symmetric parts, with the test optical channel as a center, in the FA.

Channels that are in a one-to-one correspondence with the first part and the second part form a service optical channel.

Step 202: Receive service light by using a first segment service optical channel, where a service optical channel includes the first segment service optical channel and a second segment service optical channel, where the first segment service optical channel is located in the first part and the second segment service optical channel is located in the second part.

Step 203: Enable the service light to be incident through an LA and an aspheric lens to a surface of a filter, and reflect the service light by using the filter.

Optionally, a distance between the filter and a focus of the service light of the aspheric lens is less than or equal to a second preset value.

Step 204: Output, through the second segment service optical channel, reflected light that is corresponding to the service light and that passes through the aspheric lens and the LA.

Step 205: Receive test light by using the test optical channel.

Step 206: Enable the test light to be incident through the LA and the aspheric lens to the surface of the filter, and perform transmission on the test light.

Step 207: Adjust a reflector, so that the reflector reflects, at a preset angle, the test light transmitted through the filter to a specular surface of the reflector.

Step 208: Enable reflected light corresponding to the test light to pass through the filter, the aspheric lens and the LA, and output, through the second segment service optical channel, the reflected light corresponding to the test light.

A distance between the reflector and a focus of light transmitted through the aspheric lens is less than or equal to a first preset value.

Further, in still another embodiment of the present invention, based on the foregoing embodiment shown in FIG. 6 or FIG. 7, a specific implementation manner of step 103 or step 207 may be: controlling, in a micro-electro-mechanical systems (MEMS) MEMS manner, a mechanical manner or a waveguide manner, a position or an angle that is of the specular surface of the reflector and in three-dimensional space, so that the reflector reflects, at the preset angle, the test light transmitted through the filter to the specular surface of the reflector.

Optionally, the test optical channel may further be coaxial with the LA and the aspheric lens.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An optical path processing apparatus, comprising:
   a fiber array (FA) comprising a test optical channel configured to receive test light;
   a lens array (LA);
   an aspheric lens;
   a filter, configured to perform transmission on the test light, wherein the test optical channel is configured to enable the test light to be incident through the LA and the aspheric lens to a surface of the filter; and
   a reflector, wherein the filter is located between the aspheric lens and the reflector and wherein the reflector is at a distance of less than or equal to a first preset value away from a focus of light transmitted through the aspheric lens, and is configured to reflect, at a preset angle, the test light transmitted through the filter to a specular surface of the reflector, so that reflected light corresponding to the test light passes through the filter, the aspheric lens and the LA, and is output through a particular channel.

2. The optical path processing apparatus according to claim 1, wherein the FA further comprises a service optical channel comprising:
   a first segment service optical channel, configured to receive service light, and enable the service light to be incident through the LA and the aspheric lens to the surface of the filter; and
   a second segment service optical channel, wherein the filter is further configured to reflect the service light, so that reflected light corresponding to the service light passes through the aspheric lens and the LA, and is output through the second segment service optical channel; and
   wherein the first segment service optical channel is located in a first part of the FA, and the second segment service optical channel is located in a second part of the FA, wherein the first part and the second part are horizontally and vertically symmetrical parts into which the FA is divided with the test optical channel as a center.

3. The optical path processing apparatus according to claim 2, wherein the particular channel is the second segment service optical channel.

4. The optical path processing apparatus according to claim 2, wherein a distance between the filter and a focus of the service light of the aspheric lens is less than or equal to a second preset value.

5. The optical path processing apparatus according to claim 1, wherein the test optical channel is coaxial with the LA and the aspheric lens.

6. An optical path processing method, comprising:
   receiving test light by a test optical channel, wherein the test optical channel is disposed in a fiber array (FA);
   enabling the test light to be incident through a lens array (LA) and an aspheric lens to a surface of a filter, and performing transmission on the test light by using the filter;
   adjusting a reflector, so that the reflector reflects, at a preset angle, the test light transmitted through the filter to a specular surface of the reflector; and
   enabling reflected light corresponding to the test light to pass through the filter, the aspheric lens and the LA, and outputting, through a particular channel, the reflected light corresponding to the test light;

wherein a distance between the reflector and a focus of light transmitted through the aspheric lens is less than or equal to a first preset value.

7. The optical path processing method according to claim 6, further comprising:
dividing the FA so as to acquire a first part, a second part, and the test optical channel, wherein the first part and the second part are horizontally and vertically symmetrical, with the test optical channel as a center, in the FA;
wherein channels that are in a one-to-one correspondence with the first part and the second part form a service optical channel.

8. The optical path processing method according to claim 7, further comprising:
receiving service light by a first segment service optical channel;
enabling the service light to be incident through the LA and the aspheric lens to the surface of the filter, and reflecting, by the filter, the service light; and
outputting, through a second segment service optical channel, reflected light that corresponds to the service light and that passes through the aspheric lens and the LA;
wherein the service optical channel comprises the first segment service optical channel and the second segment service optical channel, the first segment service optical channel is located in the first part and the second segment service optical channel is located in the second part.

9. The optical path processing method according to claim 8, wherein the enabling the reflected light corresponding to the test light to pass through the filter, the aspheric lens and the LA, and outputting, through a particular channel, the reflected light corresponding to the test light comprises:
enabling the reflected light corresponding to the test light to pass through the filter, the aspheric lens and the LA, and outputting, through the second segment service optical channel, the reflected light corresponding to the test light.

10. The optical path processing method according to claim 8, wherein a distance between the filter and a focus of the service light of the aspheric lens is less than or equal to a second preset value.

11. The optical path processing method according to claim 6, wherein the adjusting a reflector, so that the reflector reflects, at a preset angle, the test light transmitted through the filter to a specular surface of the reflector comprises:
controlling, in a micro-electro-mechanical systems (MEMS) manner, a mechanical manner or a waveguide manner, a position or an angle that is of the specular surface of the reflector and in three-dimensional space, so that the reflector reflects, at the preset angle, the test light transmitted through the filter to the specular surface of the reflector.

12. The optical path processing method according to claim 6, wherein the test optical channel is coaxial with the LA and the aspheric lens.

* * * * *